Patented Feb. 19, 1952

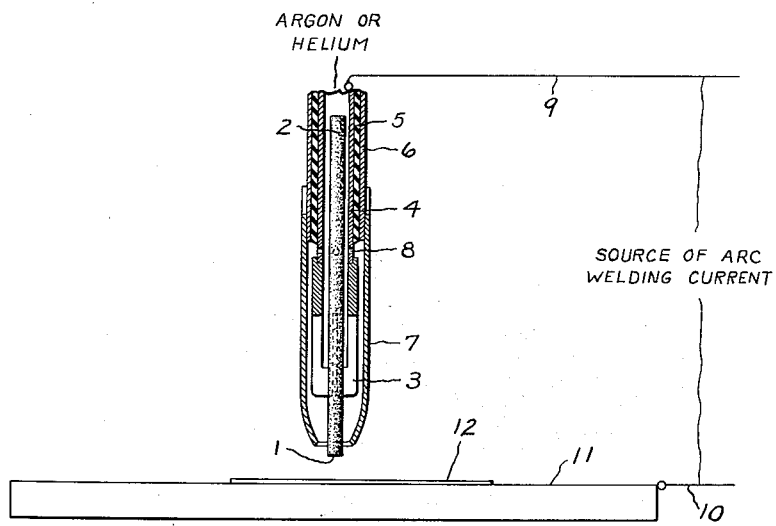

2,586,516

UNITED STATES PATENT OFFICE 2,586,516

INERT GAS ARC WELDING ELECTRODE

James D. Cobine, Schenectady, N. Y., assignor to General Electric Company, a corporation of New York Application February 12, 1949, Serial No. 76,085

5 Claims. (Cl. 219—8)

1

This invention relates to inert gas arc welding. More particularly, it relates to an improved non-consumable electrode for inert gas arc welding and the process of making such electrode.

Tungsten fabricated into a suitable form, such as a rod, is often employed as an electrode in arc welding when using inert gases such as argon and helium. In order to produce a stable arc or an arc which will not wander over the end of the electrode and up the sides of the electrode, the electrode is operated at such temperatures that the electrode is incandescent. At these temperatures, which are at or near the boiling point of the tungsten, the arc current is supplied mainly by thermionic emission from the electrode. The high temperatures result in the loss of metal from the electrode by evaporation, thus shortening its life. The necessity for having an incandescent electrode in order to maintain a stable arc also limits the current which can be used with an electrode of any particular diameter. Too large an electrode for a given current will not become incandescent and will not maintain a stable arc. One of too small a diameter for the current will evaporate too rapidly. Since a stable arc under these conditions depends on establishing a thermionic cathode spot, starting by a high frequency spark is erratic and difficult, as well as where the arc is started by bringing the electrode into direct contact with the work on an arc starting material such as carbon which is electrically connected to the work and from which the arc is transferred for the welding operation. Furthermore, once established, the cathode spot and arc wander over the surface of the electrode tip and up the sides of the electrode extinguishing the arc, causing erratic, defective and interrupted welds and damaging the welding apparatus. This instability of the arc has been troublesome in automatic arc welding and particularly so when direct current is used with the electrode negative.

An object of this invention is to provide inert gas arc welding apparatus employing an electrode which permits instant starting of a stable arc at low currents.

Another object of the invention is to provide an inert gas arc welding electrode which will start instantly at low open circuit generator voltages.

It is a further object of this invention to provide a non-consumable inert gas arc-welding electrode which operates at non-incandescent temperatures.

It is another object of the present invention to provide an instant starting and stable inert gas arc welding electrode of tungsten and zirconium oxide.

Other objects will become apparent from a consideration of the following description and the drawing in which the single figure illustrates conventionally an inert gas arc welding torch in section having an electrode such as is described herein.

The use of zirconium oxide in conjunction with the tungsten arc welding electrode produces instant starting of the arc when a high frequency spark is applied, or the electrode is touched to the work and withdrawn, as well as a steadily burning arc, the cathode spot remaining on the tip of the electrode and not wandering up its sides. When zirconium oxide is used according to this invention, the welding generator open circuit voltage necessary for starting the arc is very low, being about 40 volts D. C. as compared to about about 190 volts D. C. when tungsten alone is used as the electrode material. This characteristic of the present electrodes permits the use of smaller welding generators than would otherwise be required. The instant starting and stable arc maintenance produce steady uniform welds with no irregularities. On the other hand, when tungsten alone is used even with an impressed starting voltage of 190 volts or nearly five times as great as when zirconium oxide is used, the arc is slow and erratic in becoming established. Even after the arc is started, it has a tendency to be unstable and the cathode spot wanders about the arcing or terminal tip and up the sides of the electrode and even off the electrode onto other metal parts of the welding torch resulting in damage to the latter and frequent extinguishing of the arc. The arc must often be reestablished on the tip of the electrode only to have the cathode spot wander and finally extinguish again. This erratic behavior of the arc is annoying in any arc welding and particularly so in automatic arc welding in which the movement of the torch is often begun with the application of the high frequency starting spark. The slow and unsteady establishment of the arc using a tungsten electrode results in a blank or unwelded region on the work to be welded. After once becoming established, the wandering of the cathode spot results in an irregular and wavy weld which is defective in bonding ability. When the arc wanders up the side of the electrode, not only may the electrode-holding collet and nozzle be burned and damaged, but the arc, having become over-extended, is prone to being extinguished. This leaves another unwelded gap in the work until the cathode spot and arc are reestablished by a high frequency spark. The necessity for frequent use of the high frequency spark to restart the arc also results in objectionable interference with radio operation. A further disadvantage of the plain tungsten electrode is that the tip becomes molten and rounded as the cathode spot wanders about its edges. This melting of the electrode tip and the formation of a globule of molten metal thereon produces an increase in the arc gap distance which may cause the arc to extinguish or to produce poor welds. The molten and incandescent condition of the plain tungsten tip in actual use is also conducive to evaporation of the electrode or even loss of metal by separation or dropping of the molten globule from the electrode. On the other hand, the present electrode, operating as it does at non-incandescent and non-melting temperatures, is substantially, if not wholly, non-evaporating. The end of the present electrode being unmelted will further not change its shape as by formation of a molten globule of metal so as to require frequent and annoying adjustment of the arc gap distance. Once the arc gap is fixed, using the present electrode, it remains unchanged.

When zirconium oxide is mechanically associated with the tungsten electrode, the disadvantages of the plain tungsten electrode are obviated. When the torch is placed in motion with the application of the high frequency starting spark, there is no blank spot in the work to be welded because the arc and cathode spot are immediately established. Furthermore, once established, the cathode spot and arc remain steady at the arcing terminal of the electrode with no wandering or erratic behavior. The net result, when using zirconium oxide with the tungsten electrode, is a steady uniform weld of high strength which is commenced simultaneously with application of the high frequency spark and continues uninterruptedly until the work and torch are further separated or the current is cut off.

The advantages of the present electrode are further available when hand held welding torches are used. In those cases in which the high frequency spark is used to start the arc and cathode spot, the procedure is much the same as in the use of the automatic machine as described above. When the arc is started by short circuiting the arc gap, employment of an auxiliary carbon arc starting block or plate is recommended. In using such a block or plate, it is placed immediately adjacent the start of the weld, the electrode being touched to it and withdrawn to establish the arc and the torch and the arc then moved over to the work. Such a method avoids contaminating the material to be welded with electrode material. Thereafter, if the torch is used by an experienced welder, the only occasion for extinguishment of the arc would be a cutting off of the current.

The tungsten-zirconium oxide electrode of the present invention also operates satisfactorily at much lower currents than plain tungsten electrodes. For example, a one-sixteenth inch diameter zirconium oxide-coated tungsten electrode will instantly start at six amperes D. C. an arc which has excellent stability. On the other hand, a similar plain tungsten electrode will start a fair, though rather unstable, arc at only as high as twenty to thirty amperes D. C.

The zirconium oxide may be applied to the tungsten electrode in any of a number of ways. Powdered zirconium oxide, for example, may be mixed with powdered tungsten and the mixture sintered in the form of an electrode, care being taken not to reduce too much of the zirconium oxide to the metallic state. The electrode may also be made of cored tungsten, the core being filled with zirconium oxide or zirconium oxide and a binder. The zirconium oxide may also be coated on the sides of the electrode in any convenient manner. For example, the electrode may be simply dipped in a slurry or suspension of zirconium oxide in water, removed and dried. Alcohol or other volatile solvents may be added to the suspension to hasten drying. The zirconium oxide may also be placed in slots provided in the electrode surface. Other combinations will occur to those skilled in the art.

Binders may also be used to cause the zirconium oxide to adhere more tightly to the electrode. Of all the well known binders used for binding various coatings to welding electrodes, water glass or a water solution of sodium silicates is preferred.

The following will serve as an example of the process of making a coated tungsten electrode and is to be taken as illustrative of, rather than limiting, the process. A coating mixture was prepared by thoroughly mixing together, a ball mill is suitable, one hundred parts by weight of zirconium oxide, thirty parts by volume of water glass and ten parts by volume of water. A typical analysis of one water glass used was about nine per cent sodium oxide, thirty per cent silica and the remainder water. The tungsten electrodes are dipped momentarily in the above mixture of water glass, zirconium oxide and water, removed and treated for up to about one minute at about 1500° C. to form a gray, hard, firmly bound coating several mils thick on the electrode. The baking or firing of the coating may be dispensed with and the coating merely air dried. However, the coating thus obtained is not as durable as that produced by firing when subjected to mechanical handling and thermal shock.

The water glass used as a binding material is not believed to contribute to the advantages of this invention other than to provide a convenient way of holding the zirconium oxide in place on the electrode, the arcing action of the zirconium oxide with the above water glass binder being the same as that of zirconium oxide with no binder at all.

While zirconium oxide is the preferred material which is essential in the electrode coating to obtain the desirable results described herein, other zirconium oxide-containing materials of which an example is zirconium silicate or zircon ($ZrO_2 \cdot SiO_2$) may also be advantageously employed in the same role.

The amount of zirconium oxide or zirconium oxide containing material required in order to obtain the advantages of this invention is not critical. Just enough zirconium oxide is required to form a thin film of the oxide over the end of the electrode. Larger amounts may be used without detracting from the results, the only upper limit being that not enough should be used to permit the formation of a melt of zirconium oxide or zirconium oxide and binder which will drip onto the work and contaminate the latter. For example, in the case of a one-sixteenth inch diameter rod a coating from about one and one-half mils to two and one-half mils thick is suitable while for a one-eighth inch diameter rod a coating from about three to five mils thick is preferred.

In operation, the improved electrode of this invention is used in any conventional inert gas arc welding apparatus, a typical form of which is depicted in the drawing. As shown, tungsten electrode 1 having a coating 2 as described is held in electrical conducting relation in a spring collet 3 which in turn is attached to copper tube 4. Electrode 1 may extend into tube 4 which serves as a means for supplying inert gas, such as argon or helium, about the electrode and also as a conductor for carrying welding current to the electrode 1 through collet 3.

Tube 4 is surrounded by electrically insulating sleeve 5, which in turn is enveloped by a protecting casing 6 of some durable material, such as iron or steel. Nozzle 7 is frictionally engaged with one end of casing 6 and provides a chamber enclosing the end of tube 4 and the collet 3 mounted thereon. Gas supplied through tube 4 flows into the above chamber through a plurality of holes 8 in the side walls of tube 4 and is discharged from nozzle 7 about the arcing terminal of electrode 1.

One terminal of a source of arc welding current is connected by conductor 9 to tube 4, and the other source of supply is connected by conductor 10 to a work supporting table 11. Parts 12 to be welded are supported on this table 11 with their edges adjoining lengthwise.

The advantages attained by the application of this invention do not depend upon any so-called fluxing action, neither the electrode metal nor the material such as zirconium oxide entering the weld or forming a sheath over it. The only blanketing phenomenon present in welding according to this invention is that of the inert gases fed through the welding torch nozzle which shield the electrode and the molten part of the weld metal. The electrode of this invention may be termed non-consumable in the sense that the electrode metal does not enter the weld.

The presence of zirconium oxide enables the cathode spot and arc in inert gas arc welding to become immediately and permanently established on the tip of the tungsten electrode with no wandering up the sides of the electrode or onto other metallic parts of the welding torch or fixture.

What I claim as new and desire to secure by Letters Patent of the United States is:

1. A non-consumable inert gas arc welding electrode of tungsten which is capable of starting an arc instantly and maintaining a stable arc at temperatures below the incandescent temperature of tungsten, said electrode including as a part thereof a material providing at the arcing terminal of said electrode zirconium oxide for forming a stable cathode spot at its arcing terminal.

2. A non-consumable inert gas arc welding electrode of tungsten which has instant arc starting and stable arc operating characteristics when energized by welding circuits providing open circuit voltages as low as 40 volts D. C., said tungsten electrode including as a part thereof of zirconium oxide for forming a stable cathode spot at its arcing terminal.

3. Apparatus comprising an electrode holding gas nozzle, a non-consumable tungsten electrode containing zirconium oxide for forming a stable cathode spot at its arcing terminal, means for supplying gas to said nozzle and about said electrode, and means for supplying welding current to said electrode.

4. For use in inert gas arc welding, a non-consumable electrode consisting essentially of tungsten and having associated therewith an arc stabilizing addition of zirconium oxide which adheres during welding to the arcing terminal of said electrode to form a stable cathode spot thereon.

5. A non-consumable inert gas arc welding electrode of tungsten which is capable of starting an arc instantly and maintaining a stable arc at temperatures below the incandescent temperature of tungsten, said electrode including as a part thereof a coating material several mils thick comprising zirconium oxide.

JAMES D. COBINE.

REFERENCES CITED

The following references are of record in the file of this patent:

UNITED STATES PATENTS

| Number | Name | Date |
| --- | --- | --- |
| 1,323,768 | Hyde | Dec. 2, 1919 |
| 1,374,711 | Armor | Apr. 12, 1921 |
| 1,467,825 | Armor | Sept. 11, 1923 |
| 1,936,799 | Mathias | Nov. 28, 1933 |
| 1,977,278 | Judy | Oct. 16, 1934 |
| 2,164,775 | Miller | July 4, 1939 |
| 2,314,628 | Pavlecka | Mar. 23, 1943 |
| 2,473,600 | Lobosco | June 21, 1949 |
| 2,473,601 | Lobosco | June 21, 1949 |
| 2,515,559 | Lancaster et al. | June 18, 1950 |

FOREIGN PATENTS

| Number | Country | Date |
| --- | --- | --- |
| 147,270 | Great Britain | July 14, 1920 |
| 417,195 | Great Britain | Oct. 1, 1934 |
| 513,313 | Great Britain | Oct. 10, 1939 |

OTHER REFERENCES

Koller, Physics of Electron Tubes, pp. 5-10, McGraw-Hill Book Company, Inc., 1937.